United States Patent
Ye et al.

(10) Patent No.: US 9,499,144 B2
(45) Date of Patent: Nov. 22, 2016

(54) ROLLING DISTANCE DETECTION SYSTEM AND STRATEGY FOR VEHICLE

(71) Applicant: Continental Automotive Systems, Inc., Auburn Hills, MI (US)

(72) Inventors: Bo Ye, Rochester Hills, MI (US); Pedro Henriques, Rochester Hills, MI (US); Sai-pavan Eswara, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 96 days.

(21) Appl. No.: 14/504,466

(22) Filed: Oct. 2, 2014

(65) Prior Publication Data
US 2016/0096515 A1    Apr. 7, 2016

(51) Int. Cl.
*B60T 8/32* (2006.01)
*F16C 41/00* (2006.01)
*G01P 3/44* (2006.01)
*B60T 8/171* (2006.01)

(52) U.S. Cl.
CPC .............. *B60T 8/32* (2013.01); *B60T 8/171* (2013.01); *B60T 8/329* (2013.01); *F16C 41/007* (2013.01); *G01P 3/44* (2013.01)

(58) Field of Classification Search
USPC ....... 701/70, 1, 112, 68, 82, 93, 113, 22, 36, 701/78
See application file for complete search history.

(56) References Cited

U.S. PATENT DOCUMENTS

| | | | | |
|---|---|---|---|---|
| 6,679,810 B1 * | 1/2004 | Boll | .......... | B60T 7/122 477/191 |
| 2003/0050749 A1 * | 3/2003 | Cervantez | ........ | B60G 17/01933 701/49 |
| 2012/0072076 A1 * | 3/2012 | Gustavsson | .............. | B60K 6/46 701/41 |
| 2014/0012471 A1 | 1/2014 | Nakaso | | |
| 2014/0184785 A1 * | 7/2014 | Sperrle | .................... | B60T 8/172 348/113 |
| 2014/0309901 A1 * | 10/2014 | Schneider | ............... | B60T 7/122 701/70 |

FOREIGN PATENT DOCUMENTS

| | | |
|---|---|---|
| GB | 2053394 A | 2/1981 |
| GB | 2483719 A | 3/2012 |
| JP | 2000097959 A | 4/2000 |

OTHER PUBLICATIONS

European Patent Office Search Report 1518749701 dated Feb. 9, 2016.

* cited by examiner

*Primary Examiner* — Mussa A Shaawat
*Assistant Examiner* — Abdhesh Jha

(57) ABSTRACT

A vehicle includes a tone wheel having a plurality of encoding members spaced substantially evenly about a periphery thereof. Each tone wheel is rotates with an associated wheel. A fixed speed sensor is mounted adjacent to each tone wheel. The vehicle includes a brake system. A method determines a travel distance between adjacent encoding members. A required rolling distance of a vehicle from standstill is established. Maximum allowed interrupts per wheel is established, with an interrupt defined as each instance an encoding member passes an associated speed sensor. It is determined whether the vehicle is actually rolling from standstill. Once the vehicle is actually rolling, a number of interrupts is counted at each wheel. When the maximum allowed interrupts is counted at each wheel, the brake system is supplied with pressure increase to return the vehicle to, and hold the vehicle at, standstill prior to reaching the required rolling distance.

13 Claims, 2 Drawing Sheets

ROLLING DISTANCE DETECTION SYSTEM AND STRATEGY FOR VEHICLE

FIELD

The invention relates to determining rolling distance of a vehicle and, more particularly, to structure and a strategy for determining rolling distance from standstill so that an Electronic Brake System (EBS) of the vehicle can start building-up pressure once the vehicle begins rolling.

BACKGROUND

In a vehicle EBS with Automatic Vehicle Hold (AVH) or with Full Speed Range Adaptive (FSRA) cruise control, normally the rolling distance from standstill needs to be determined. When vehicle starts rolling, the EBS needs to build pressure (by running a hydraulic pump or active booster, etc.) to bring vehicle back to standstill. However, current vehicle rolling detection is too sensitive and it leads to multiple pump or active booster activations that generate noticeable noise.

There is a need for improved rolling distance detection structure that does not require running the pump too frequently and thereby reduces Noise, Vibration and Harshness (NVH) in a vehicle.

SUMMARY

An objective of the invention is to fulfill the need referred to above. In accordance with the principles of an embodiment, this objective is obtained by providing a system for detecting and controlling rolling distance of a vehicle from standstill. The system includes a tone wheel mounted to an associated wheel of a vehicle so as to rotate there-with. Each tone wheel has a plurality of encoding members spaced substantially evenly about a periphery thereof. A speed sensor is associated with each tone wheel so as to generate a signal when an encoding member passes the sensor. A control unit in an EBS is constructed and arranged to receive the signals from the sensors. The control unit has a microprocessor circuit. When the vehicle rolls from standstill with the wheels rotating the associated tone wheels, the sensors are constructed and arranged to send the signals to the control unit with microprocessor circuit counting as an interrupt, when one of the encoding members passes an associated sensor. When a maximum allowed number of interrupts is counted at each wheel, the control unit within the EBS is constructed and arranged to command the brake system to be supplied with pressure increase to return the vehicle to, and hold the vehicle at, standstill prior to reaching the required rolling distance.

In accordance with another aspect of an embodiment, a method detects and controls the rolling distance of a vehicle from standstill. The vehicle includes a tone wheel having a plurality of encoding members spaced substantially evenly about a periphery thereof. Each tone wheel is constructed and arranged to rotate with an associated wheel. A fixed speed sensor is mounted generally adjacent to each tone wheel. The vehicle includes a brake system. The method determines a travel distance between adjacent encoding members based on the number of encoding members and the tire circumference of the wheel. A required rolling distance of a vehicle from standstill is established. Maximum allowed interrupts per wheel is established, with an interrupt being defined as each instance an encoding member passes an associated speed sensor. It is determined whether the vehicle is actually rolling from standstill. Once the vehicle is actually rolling, a number of interrupts is counted at each wheel. Upon the occurrence of the maximum allowed interrupts counted at each wheel, the brake system is supplied with pressure increase to return the vehicle to, and hold the vehicle at, standstill prior to reaching the required rolling distance.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
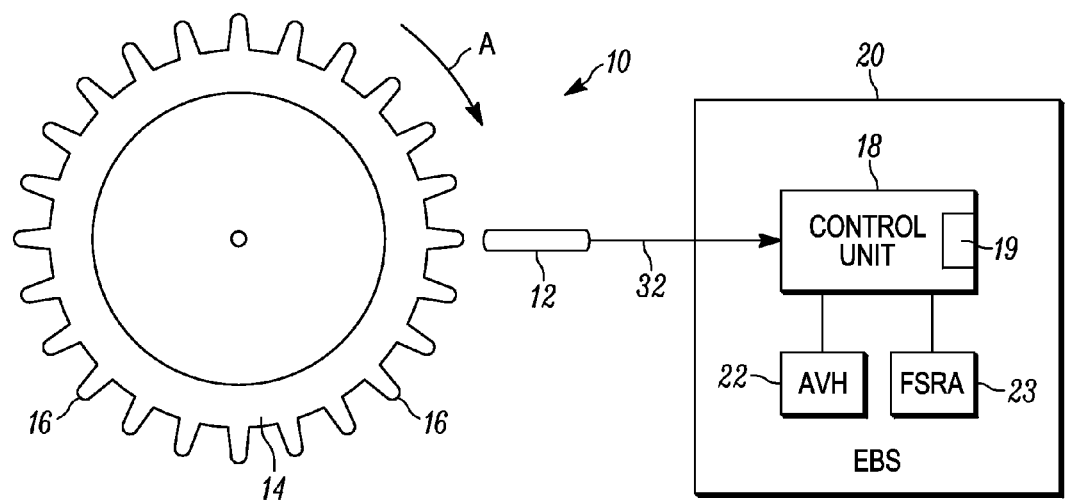
FIG. 1 is schematic view of a wheel speed sensor structure in accordance with an embodiment.

With reference to FIG. 1, a schematic view of a wheel speed sensor system is shown, generally indicated at 10, in accordance with an embodiment. The system 10 includes a speed sensor 12 mounted adjacent to a metal tone wheel 14, which is mounted with respect to a vehicle wheel (not shown in FIG. 1) so as to rotate therewith. As used herein, "wheel" can include the wheel axle. The tone wheel 14 includes encoding members 16, preferably in the form of evenly spaced teeth or perforations on a periphery of the tone wheel 14.

The sensor 12 is constructed and arranged to measure the speed and direction A of rotation of the tone wheel 14 to thus determine the road wheel speed of the vehicle. In the embodiment, the sensor 12 detects when the encoding members (teeth) 16 pass by the sensor 12. The sensor 12 is electrically connected with an electronic control unit (ECU) 18 of an Electronic Brake System (EBS) 20. The control unit 18 has microprocessor circuit 19 to execute the logic described below. The EBS 20 can support Automatic Vehicle Hold (AVH) function 22 and Full Speed Range Adaptive (FSRA) cruise control function 23 for the vehicle.

Figure 2:
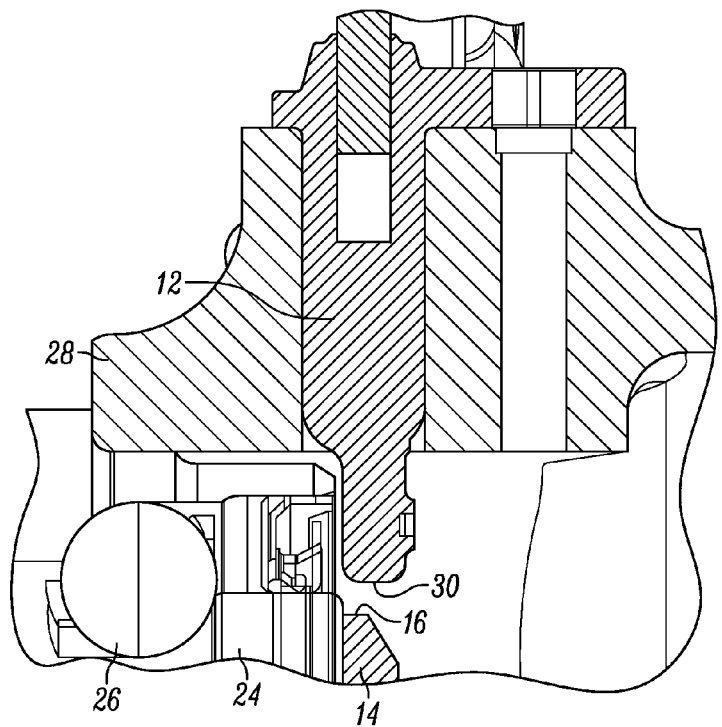
FIG. 2 is a partial sectional view of a sensor shown mounted adjacent to a tone wheel of the system of FIG. 1, with the tone wheel being mounted to rotate with a wheel axle.

The sensor 12 may monitor the rotation of the crankshaft or driveshaft of a vehicle, when the rate at which individual wheels are turning does not need to be determined. In the embodiment, the sensor 12 monitors the rotation of the casing or axle 24 (FIG. 2) driving each wheel. Thus, with reference to FIG. 2, a tone wheel 14 is fixedly connected to each wheel axle 24 so as to rotate with the wheel axle 24 at the same speed as the wheel axle 24. Ball bearings 26 are provided in the conventional manner to permit rotation of the wheel axle 24 and tone wheel 14. The sensor 12 is fixed with respect to a mounting member or knuckle 28 so that an end 30 of the sensor 12 is adjacent to the encoding members (teeth 16) of the tone wheel 14.

The sensor 12 is preferably of the conventional magnetic type when the tone wheel 14 is made of steel. The sensor 12 can be a variable reluctance type sensor or a Hall effect sensor. Both of these magnetic type sensors detect the teeth 16 of the steel tone wheel 14 as it rotates adjacent to the sensor 12. Variable reluctance sensors detect the change in the inductance of a wire coil as a steel tooth comes into close proximity. Hall effect sensors measure the change in the resistance of a semi-conducting slab due to the strength of an applied magnetic field. The Hall effect sensor 12 acts much like a magnetic switch. When a tooth 16 of the tone wheel 14 rotates past the sensor 12, current is allowed to flow creating an output signal 32 from the sensor 12, with the number of times the teeth pass the sensor 12 being counted by the control unit 18. Instead of using a magnetic sensor 12, and steel tone wheel 14 with teeth 16, the sensor 12 can be of the conventional, optical type, with the wheel tone being optically encoded (defining the encoding members 16).

In a vehicle EBS with Automatic Vehicle Hold (AVH) or Full Speed Range Adaptive (FSRA) cruise control, the rolling distance from standstill needs to be determined. When vehicle starts rolling, the EBS needs to build pressure by running a hydraulic pump to bring vehicle back to standstill. Thus, in accordance with an embodiment, a travel distance per tooth is first calculated. For example, if the tone wheel 14 has fifty teeth 16 and the circumference of the tire is two meters or 2,000 mm, then the distance a tire/wheel will travel between adjacent teeth 16 is 2000/50=40 mm. Thus, the travel distance per tooth for the example system 10 is 40 mm.

Figure 3:
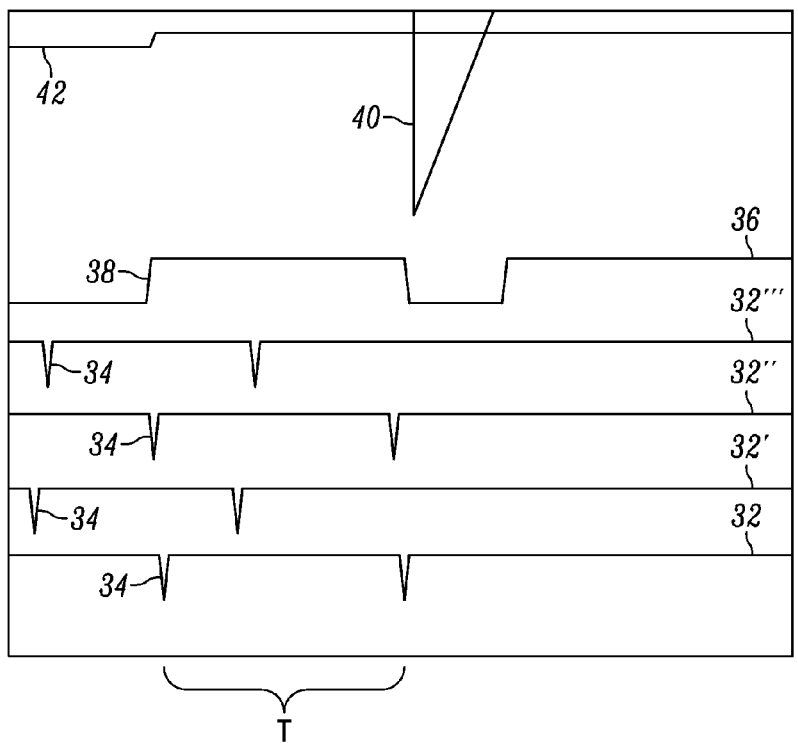
FIG. 3 shows various electrical signals associated with the use of the system of FIG. 1.

For a given customer requirement on the rolling distance during AVH/FSRA, using the sensor structure 10, the rolling distance can be converted into wheel interrupts permitted on each wheel, based on the travel distance between each tooth 16. FIG. 3 shows the output signals 32, 32', 32'' and 32''' from each sensor 12 at a respective wheel of a vehicle. The peaks in each signal 32, 32', 32'' and 32' indicate a wheel interrupt 34, where a tooth 16 passes the associated sensor 12.

An example of a customer requirement on rolling distance is: the maximum distance the vehicle is allowed to roll is less than 160 mm on a 10% grade. This requirement can be interpreted as maximum allowed teeth rolled=160 mm/travel distance per tooth=160/40=4 (teeth). Thus, an interrupt 34 occurs once a tooth 16 passes by the sensor 12, so if more than four interrupts are detected on one wheel when the vehicle is rolling, the rolling distance will exceed 160 mm. To make sure that there is enough time to build pressure to bring the vehicle back to standstill, the maximum allowed interrupts 34 (four in the example) is reduced to about 1.5 to 2 interrupts 34 per wheel.

With reference to FIG. 3, the signal 36 is a standstill flag and it is noted that during the peak 38 or high time of signal 36, the vehicle is still moving, since there are interrupts 34 detected during this time T. After a total of two (maximum allowed per wheel) interrupts 34 have occurred for each signal 32, 32' 32'' and 32''', the signal 36 goes low and a request signal 40 for build-up pressure is generated by the EBS 20 and the brake system returns the vehicle to standstill, as evidenced by no interrupts 34 existing after the time period T.

Since all four wheels are being monitored, a situation is to be avoided wherein the vehicle is oscillating back and forth (considered as not rolling), which might cause one specific tooth 16 to pass back and forth by the sensor 12. With four wheels, the possibility of one specific tooth on each wheel oscillating back and forth around the sensor 12 is very low, which reduces the risk of false rolling detection. Thus, in accordance with an embodiment, to determine whether the vehicle is actually rolling, the system 10 monitors six interrupts 34 (1.5 interrupts per wheel×4 wheels) on all four wheels over a predefined time. This is termed the maximum allowed total interrupts.

As noted above, the vehicle rolling detection strategy can be used by Automatic Vehicle Hold (AVH) function or Full Speed-range ACC (FSA or ACC Stop and Go) function, or any function which has a rolling distance requirement. The signal 42 of FIG. 3 is a function activation flag that indicates when one of these functions is active and vehicle is held at standstill by this function.

Figure 4:
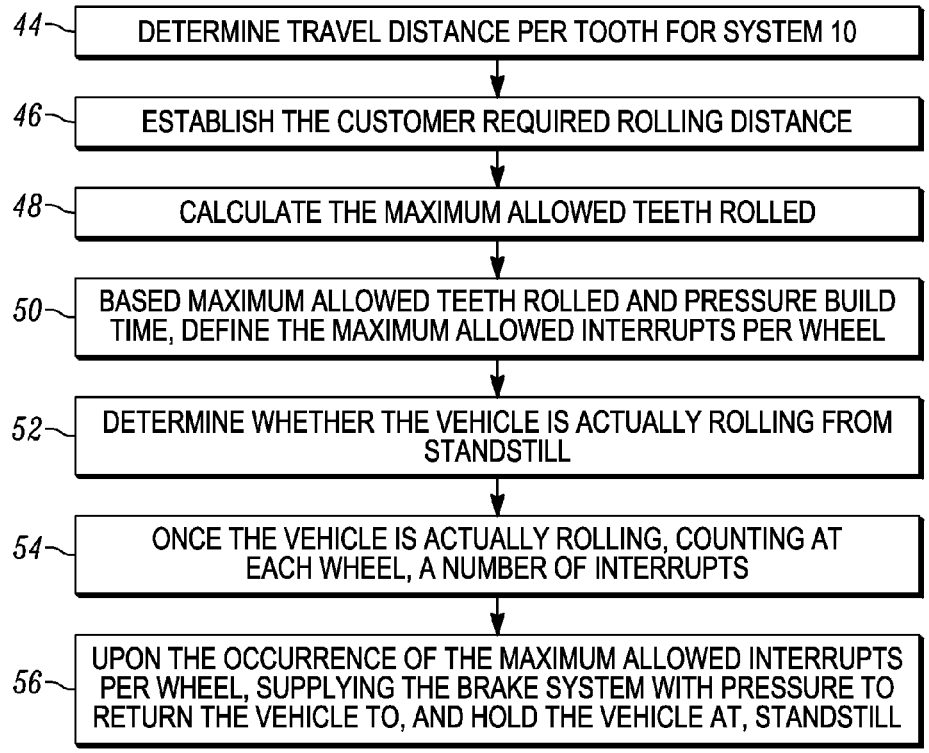
FIG. 4 is a flow chart of a method of using the system of FIG. 1 to detect and control rolling distance of a vehicle.

With reference to FIG. 4, an example of an algorithm executed by the processor circuit 19 is shown. In step 44, the travel distance per tooth for the system 10 is determined based on the tooth information and the tire circumference of the wheel. In the example, this travel distance per tooth is 40 mm. In step 46, the customer required rolling distance is obtained or established. In the example, this distance is 160 mm. In step 48, the maximum allowed teeth rolled is calculated. In the example, the maximum allowed teeth rolled is four. Based the maximum allowed teeth rolled and hydraulic brake pressure build time, in step 50, the maximum allowed interrupts 34 per wheel is determined so as to be a value less than the value of the maximum allowed teeth rolled. In the example, the maximum allowed interrupts per wheel is two interrupts 34. In step 52, it is determined when the vehicle is actually rolling from standstill. This can be done by monitoring the maximum allowed total interrupts as noted above. Once the vehicle is determined to be actually rolling from standstill, in step 54, a number of interrupts is counted at each wheel by use of the sensor 12 sending the signal 32 to the control unit 18 and microprocessor circuit 19. Upon the occurrence of the maximum allowed interrupts being counted at each wheel, in step 56, the hydraulic brake system is supplied with hydraulic pressure increase to return the vehicle to, and hold the vehicle at, standstill prior to reaching the required rolling distance.

Thus, the vehicle rolling detection strategy of the embodiment can be customized based on the customer rolling distance requirement. This vehicle rolling detection strategy avoids unnecessary pressure build (pump activation or active booster activation) if vehicle just slightly moves and it's within customer defined range. Therefore, Noise, Vibration and Harshness (NVH) in a vehicle can be avoided.

The operations described herein can be implemented as executable code within the EBS 20 microprocessor circuit 19 as described or stored on a standalone computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of detecting and controlling a rolling distance of a vehicle from standstill, the vehicle including a tone wheel having a plurality of encoding members spaced substantially evenly about a periphery thereof, each tone wheel being constructed and arranged to rotate with an associated wheel; and a fixed speed sensor mounted generally adjacent to each tone wheel, the vehicle including a brake system, the method comprising the steps of:
   determining a travel distance between adjacent encoding members based on the number of encoding members and a tire circumference of the wheel,
   establishing a required rolling distance of a vehicle from standstill,
   establishing maximum allowed interrupts per wheel, with an interrupt being defined as each instance an encoding member passes an associated speed sensor, wherein the step of establishing maximum allowed interrupts per wheel comprises:
      determining maximum allowed encoding members rolled by dividing the required rolling distance by the travel distance between adjacent encoding members, and
      based the maximum allowed encoding members rolled and hydraulic brake pressure build time, establishing the maximum allowed interrupts per wheel to be a value less than a value of the maximum allowed encoding members rolled,
   determining whether the vehicle is actually rolling from standstill,
   once the vehicle is actually rolling from standstill, counting at each wheel, a number of interrupts, and
   when the maximum allowed interrupts is counted at each wheel, supplying the brake system with pressure increase to return the vehicle to, and hold the vehicle at, standstill prior to reaching the required rolling distance.

2. The method of claim 1, wherein the encoding members are teeth on the periphery of each tone wheel and each sensor is a Hall effect sensor.

3. The method of claim 2, wherein the step of determining the travel distance includes dividing the circumference of the tire by a total number of the teeth.

4. The method of claim 1, wherein the step of establishing the required rolling distance is setting the required rolling distance to a maximum distance of 160 mm which the vehicle is allowed to roll from standstill on a 10% grade.

5. The method of claim 1, wherein the step of determining whether the vehicle is actually rolling comprises:
   monitoring a maximum allowed total interrupts over a period of time, wherein the maximum allowed total interrupts is defined by multiplying the maximum allowed interrupts per wheel by the number of wheels of the vehicle.

6. The method of claim 2, wherein the counting step includes using the sensor to send a signal to an electronic control unit (ECU) with a microprocessor circuit when a tooth passes an associated sensor.

7. The method of claim 1, further comprising:
   employing the method when the brake system is in used in combination with Automatic Vehicle Hold (AVH) or with Full Speed Range Adaptive (FSA) cruise control.

8. A system for detecting and controlling rolling distance of a vehicle from standstill, the system comprising:
   a tone wheel mounted to an associated wheel of a vehicle so as to rotate there-with, each tone wheel having a plurality of encoding members spaced substantially evenly about a periphery thereof,
   a speed sensor associated with each tone wheel so as to generate a signal when an encoding member passes the sensor,
   a brake system having an electronic control unit constructed and arranged to receive the signals from the sensors, the control unit having microprocessor circuit, and
   wherein when the vehicle rolls from standstill with the wheels rotating the associated tone wheels, the sensors are constructed and arranged to send the signals to the control unit with the microprocessor circuit counting as an interrupt, when one of the encoding members passes an associated sensor, and
   wherein when a maximum allowed number of interrupts is established at each wheel, the control unit is constructed and arranged to command the brake system to be supplied with pressure increase to return the vehicle to, and hold the vehicle at, standstill prior to reaching the required rolling distance,
   wherein the control unit is constructed and arranged to establish the maximum allowed interrupts per wheel by:
      determining maximum allowed encoding members rolled by dividing the required rolling distance by the travel distance between adjacent encoding members, and
      based the maximum allowed encoding members rolled and hydraulic brake pressure build time, establishing the maximum allowed interrupts per wheel to be a value less than a value of the maximum allowed encoding members rolled.

9. The system of claim 8, wherein the encoding members are teeth on the periphery of each tone wheel and each sensor is a Hall effect sensor.

10. The system of claim 8, in combination with the vehicle, each tone wheel being coupled to an associated wheel axle of the vehicle.

11. The system of claim 8, wherein the brake system is a hydraulic brake system and the pressure is hydraulic pressure.

12. The system of claim 8, wherein the brake system is an electronic brake system having Automatic Vehicle Hold (AVH).

13. The system of claim 8, wherein the brake system is an electronic brake system supporting a Full Speed Range Adaptive (FSA) cruise control system.

* * * * *